(12) United States Patent
Behrens et al.

(10) Patent No.: US 6,614,724 B2
(45) Date of Patent: Sep. 2, 2003

(54) HYDROPHONE ARRAY WITH INDIVIDUALLY SWITCHABLE HYDROPHONE SENSORS

(75) Inventors: William H. Behrens, Sugar Land, TX (US); Jim Nash, Houston, TX (US)

(73) Assignee: Input/Output, Inc., Stafford, TX (US)

(*) Notice: Subject to any disclaimer, the term of this patent is extended or adjusted under 35 U.S.C. 154(b) by 0 days.

(21) Appl. No.: 10/008,289

(22) Filed: Nov. 8, 2001

(65) Prior Publication Data

US 2002/0089896 A1 Jul. 11, 2002

Related U.S. Application Data

(60) Provisional application No. 60/248,098, filed on Nov. 13, 2000.

(51) Int. Cl.[7] .............................. G01V 1/38; G01V 1/20
(52) U.S. Cl. ......................................... 367/154; 367/20
(58) Field of Search ........................ 367/20, 153, 154, 367/106, 129, 130; 181/110, 112

(56) References Cited

U.S. PATENT DOCUMENTS

| 4,375,089 A | * | 2/1983 | Thigpen et al. ................ 367/20 |
| 4,928,262 A | * | 5/1990 | Neeley et al. ............... 367/106 |
| 6,318,497 B1 | * | 11/2001 | De Groot et al. ........... 181/110 |

* cited by examiner

*Primary Examiner*—Ian J. Lobo
(74) *Attorney, Agent, or Firm*—Madan, Mossman & Sriram, P.C.

(57) ABSTRACT

The present invention is directed to a hydrophone streamer towable from a marine vessel on a body of water. The hydrophone streamer comprises a plurality of hydrophones electrically connected in parallel. Each hydrophone further comprises a normally-closed pressure activated switch connected in series with a hydrophone sensor. Each pressure switch is calibrated to open at a predetermined depth in the body of water thereby disabling the associated sensor without affecting operation of other hydrophones in the streamer.

8 Claims, 1 Drawing Sheet

HYDROPHONE ARRAY WITH INDIVIDUALLY SWITCHABLE HYDROPHONE SENSORS

RELATED APPLICATION

This application is related to a U.S. provisional application titled:"Hydrophone Array with Individually Switchable Hydrophone Sensors" filed Nov. 13, 2000, Ser. No. 60/248,098, the entire specification of which is hereby incorporated herein by reference and from which priority is claimed for the present application.

BACKGROUND OF THE INVENTION

1. Field of the Invention

This invention generally relates to geologic surveying using hydrophones, and more particularly to hydrophone arrays requiring switchable hydrophones.

2. Description of the Related Art

Oil and gas exploration on the oceans of the earth for deposits of oil, gas and other valuable minerals is currently conducted using seismic techniques in which an exploration vessel imparts an acoustic wave into the body of water, typically by use of a compressed air "gun." The air gun is activated to initiate an acoustic wave. The acoustic wave travels downwardly into the sea bed and is reflected at the interfaces between layers of materials having varying acoustic impedances. The reflected wave travels back upwardly where it is detected by microphone or "hydrophone" elements in a streamer towed by the vessel to yield information regarding characteristics of the underwater material and structures.

A towed streamer comprises a plurality of pressure-sensitive hydrophone elements enclosed within a waterproof jacket and electrically coupled to recording equipment onboard the vessel. Each hydrophone element within the streamer is designed to convert the mechanical energy present in pressure variations surrounding the hydrophone element into electrical signals. The streamer may be divided into a number of separate sections or "modules" that can be decoupled from one another and that are individually waterproof. Individual streamers can be towed in parallel through the use of paravanes to create a two dimensional array of hydrophone elements. Data buses running through each of the modules in the streamer carry the signals from the hydrophone elements to the recording equipment (so-called "acoustic data").

Certain export regulations are placed on hydrophone assemblies manufactured for sale to foreign countries. One such regulation requires that hydrophone assemblies be non-operable below a specified depth. The typical disabling method is to use a pressure-activated normally-open switch as a disabling mechanism to short-circuit a hydrophone at the limit depth. The switch is connected in parallel across a hydrophone element. The pressure associated with a specified depth limit is calculated, and the switch is calibrated to close at the calculated pressure i.e. depth. When the normally-open switch closes at the specified depth, the associated hydrophone element is shorted, thus disabled. These depth-sensitive hydrophones are known as "export" hydrophones.

Hydrophone streamers are assembled by electrically connecting hydrophones in a parallel circuit along the length of the streamer. A serious drawback exists when the export hydrophones described above are used in streamers. When one export hydrophone disabling mechanism is activated to disable one hydrophone element, all hydrophones in the streamer are likewise disabled. This effect is due to the parallel relationship between the disabling switch and the hydrophone elements, and the parallel relationship between the several hydrophones in the streamer. Since a streamer may contain hundreds of sensors spaced over many kilometers, a prematurely activated switch can result in the loss of great amounts of valuable data.

A pressure switch may activate at depths above the limit depth due to a calibration error, or a random switch failure. A resettable switch may help in some failure cases or when the sensor goes below the limit and then rises above the limit. However, many common switch failures result in permanent shorting of the normally-open switch. In these cases, the streamer must be reeled in. The specific failed switch must be found and replaced or the entire streamer must be replaced before data acquisition can resume. This procedure can be very time consuming and expensive to the exploration operations.

SUMMARY OF THE INVENTION

The present invention addresses the drawbacks described above by providing an export hydrophone streamer having individual hydrophone assemblies, wherein each hydrophone assmebly includes a sensor and a disabling mechanism that will disable that particular hydrophone assembly without affecting the operation of other hydrophone assemblies in the streamer.

In one aspect of the invention, a geologic survey apparatus is provided. The apparatus comprises a control platform, a plurality of geologic survey sensors electrically connected to the control platform, and a plurality of sensor disabling devices, each sensor disabling device being operatively associated with a corresponding one of the plurality of sensors. Each of the plurality of disabling devices is adapted to sense a limit condition. The disabling devices disable the corresponding one of the plurality of sensors without affecting other ones of the plurality of sensors.

In another aspect of the invention a hydrophone streamer towable from a marine vessel on a body of water is provided. The hydrophone streamer comprises a plurality of hydrophones electrically connected in parallel. Each hydrophone further comprises a normally-closed pressure activated switch connected in series with a hydrophone sensor. Each pressure switch is calibrated to open at a predetermined depth in the body of water thereby disabling the associated sensor without affecting operation of other hydrophones in the streamer.

BRIEF DESCRIPTION OF THE DRAWINGS

For detailed understanding of the present invention, reference should be made to the following detailed description of the preferred embodiment, taken is conjunction with the accompanying drawing, in which like elements have been given like numerals and wherein.

DESCRIPTION OF THE PREFERRED EMBODIMENTS

Figure 1:
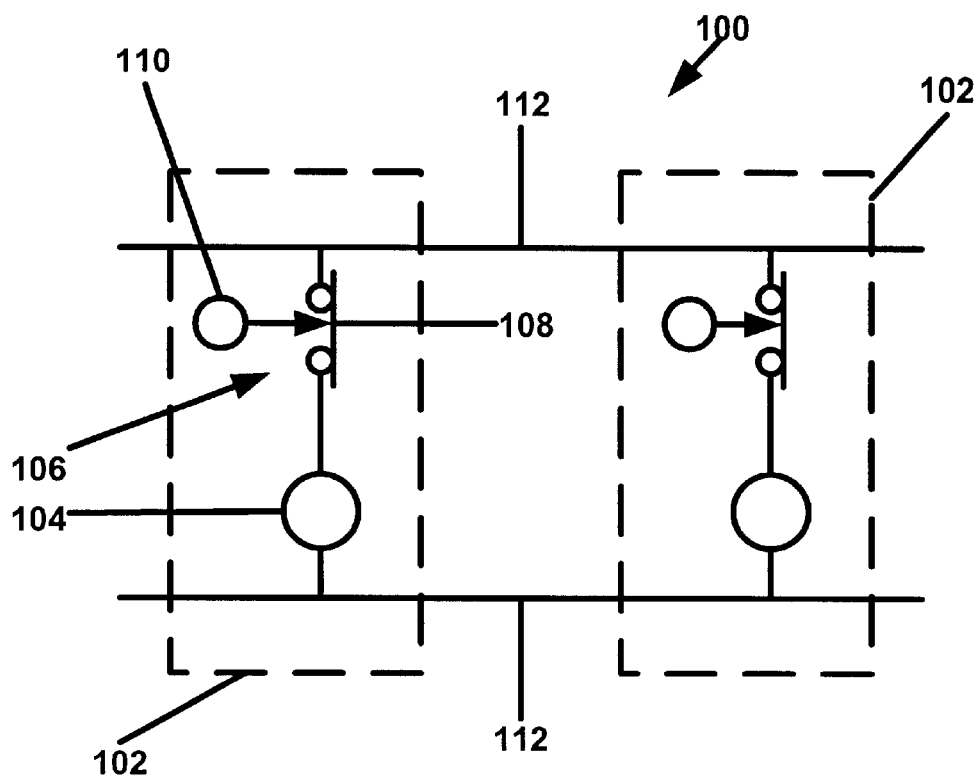
FIG. 1 is a schematic drawing showing part of a streamer according to one embodiment of the present invention including disabling devices for each of a plurality of sensors in the streamers.

Referring to FIG. 1, shown is a schematic drawing of a streamer portion according to one embodiment of the present invention including disabling devices for each of a plurality of sensors in the streamers. Streamer 100 is coupled to a marine vessel such as a tow ship (not shown) and towed behind the ship through a body of water. A structural cable (not shown) couples the streamer 100 to the ship. The structural cable includes electrical conductors 112 such as wires leading to a plurality of hydrophones assemblies 102, which are spaced along the streamer 100.

The hydrophone assemblies 102 are electrically connected to the conductors 112 in parallel circuit. Each hydrophone 102 is substantially identical to the other hydrophones assemblies 100. Only one hydrophone 102 will be described in detail for brevity. The hydrophone 102 comprises an acoustic sensor element, or simply sensor, 104 coupled to a sensor disabling mechanism 106. The sensor 104 and sensor disabling mechanism 106 are preferably electrically coupled in series and the sensor disabling mechanism 106 disables the sensor 104 by opening i.e. disconnecting the series combination. The hydrophone 102 is thus electrically disconnected from the conductors 112 thereby disabling the particular hydrophone 102 without disabling any other hydrophone assemblies 100.

The disabling mechanism 106 preferably a pressure activated switch comprising a switch 108 coupled to an activating mechanism 110. In the embodiment shown in FIG. 1, the switch 108 is a normally-closed switch and the activating mechanism 110 is a pressure sensitive mechanism. Pressure activated switches of this type are well known.

The pressure sensitive mechanism 110 is typically calibrated during manufacturing of the device 106 to activate at a predetermined pressure. The predetermined pressure corresponds to a limit depth beyond which the device 106 activates to disable the hydrophone assembly 102.

A typical manufacturing process for manufacturing export hydrophones includes calibrating a disabling mechanism 106 to a predetermined depth to meet export regulations. The disabling device 106 is connected to the sensor 104 to build the hydrophone assembly 102. The circuitry is then encapsulated in a polymer resin using a process known as potting. Potting the circuit provides several functions including protecting the components from environmental damage, waterproofing the electrical circuit, and preventing alteration of the disabling circuit.

The foregoing description is directed to particular embodiments of the present invention for the purpose of illustration and explanation it will be apparent, however, to one skilled in the art that many modifications and changes to the embodiments set forth above are possible without departing from the scope and the spirit of the invention. It is intended that the following claims be interpreted to embrace all such modifications and changes.

We claim:

1. A geologic survey apparatus comprising:

a control platform;

a plurality of geologic survey sensors electrically connected to the control platform; and a plurality of sensor disabling devices, each sensor disabling device being operatively associated with a corresponding one of the plurality of sensors, each of the plurality of disabling devices adapted to sense a limit condition and to disable the corresponding one of the plurality of sensors without disabling other ones of the plurality of sensors.

2. The apparatus of claim 1, wherein the control platform further comprises a marine vessel.

3. The apparatus of claim 1, wherein the geologic survey sensors are hydrophones.

4. The apparatus of claim 1, wherein each disabling device further comprises an electrical switch and an activating member, wherein the activating member determines the existence of the limit condition and activates the switch upon the existence of the limit condition.

5. The apparatus of claim 1, wherein plurality of geologic survey sensors are hydrophones electrically interconnected in parallel to form a marine streamer.

6. The apparatus of claim 2, wherein the limit condition is a predetermined depth below the surface of a body of water.

7. The apparatus of claim 1, wherein the disabling devices include a differential pressure gauge.

8. A geologic survey apparatus comprising:

a marine vessel on a body of water; and at least one hydrophone streamer towable from the marine vessel, the at least one hydrophone streamer further comprising, a plurality of hydrophones electrically connected in parallel, each hydrophone further comprising a normally-closed pressure activated switch connected in series with a hydrophone sensor, wherein each pressure activated switch is calibrated to open at a predetermined depth in the body of water thereby disabling the associated sensor without disabling other hydrophones in the streamer.

\* \* \* \* \*